(12) United States Patent
Schneidedr (10) Patent No.: US 7,247,086 B2
(45) Date of Patent: Jul. 24, 2007

(54) APPARATUS AND PROCEDURE FOR FISH PIN BONING

(75) Inventor: Chistian Garcia Schneidedr, Santago (CL)

(73) Assignee: Prointech S.A., Santiago (CL)

( * ) Notice: Subject to any disclaimer, the term of this patent is extended or adjusted under 35 U.S.C. 154(b) by 0 days.

(21) Appl. No.: 11/271,982

(22) Filed: Nov. 14, 2005

(65) Prior Publication Data

US 2006/0105691 A1    May 18, 2006

(30) Foreign Application Priority Data

Nov. 15, 2004    (CL) ................................ 2930-2004

(51) Int. Cl.
*A22C 25/16*    (2006.01)
(52) U.S. Cl. ........................ 452/137; 452/102; 452/135
(58) Field of Classification Search ................ 452/101, 452/102, 103, 104, 105, 134, 135, 136, 137, 452/138, 139, 140; 607/72; 601/46, 61; 30/44; 310/15
See application file for complete search history.

(56) References Cited

U.S. PATENT DOCUMENTS

| 3,711,896 | A | * | 1/1973 | Guberman et al. | .......... 452/141 |
| 3,896,522 | A | * | 7/1975 | Lapeyre | ....................... 452/135 |
| 3,992,734 | A | * | 11/1976 | Chiron et al. | ................ 452/156 |
| 4,432,117 | A | * | 2/1984 | Iskiw | ........................... 452/98 |
| 4,793,232 | A | * | 12/1988 | Villemin et al. | ............. 452/136 |
| 4,942,642 | A | * | 7/1990 | Fankhauser et al. | ......... 452/136 |
| 5,542,877 | A | * | 8/1996 | Taylor | ............................ 452/7 |

* cited by examiner

*Primary Examiner*—David Parsley
(74) *Attorney, Agent, or Firm*—Finnegan, Henderson, Farabow, Garrett & Dunner, L.L.P.

(57) ABSTRACT

An apparatus and procedure for extracting pin bones from fish. The procedure comprises detaching the pin bones from the meat using vibrations, and then, extracting the pin bone using only enough traction force in order to pull out the pin bone, thus preserving its integrity, without damaging the interior and exterior of the meat. The apparatus comprises a vibrations generator, a pin boning device, and a device for transmitting vibrations from the generator to the pin boning device. In a preferred embodiment, the apparatus further comprises a torque generator including a maximum output torque controlling device.

9 Claims, 10 Drawing Sheets

APPARATUS AND PROCEDURE FOR FISH PIN BONING

This invention relates to an apparatus and a procedure for pin boning fish. The apparatus permits the extraction of fish pin bones without affecting the integrity of the meat, and without breaking the pin bones, thus avoiding that parts thereof remain inserted within the fish meat.

ANTECEDENTS OF THE INVENTION

It is common to sell several types of fish in the form of filets (fillets) already pin boned. These filets are obtained by cutting the fish along each side of the backbone by hand, with a knife or using apparatus or machines. Each of these machines or apparatus is designed for separating most of the meat from the backbone, avoiding damage to the integrity of the filets. However, the presence of ventral bones ("pin bones") obliges further boning for rendering an acceptable product). Therefore, after culling the filets, some pin bones remain adhered or, in some cases, they remain inserted in the fish meat and shall be extracted.

This problem is present during all types' salmon processing and is particularly complex in countries where salmon production is intended for the most demanding markets, implying compliance with the highest quality standards.

The quality highly relates with the time elapsing from the fish death until the product arrive to its destination place, comprising the time spent in processing and packaging.

Specifically in countries like Chile, salmon is processed shortly after capture, pursuant the quality standards of the intended markets. Nevertheless, this amount of time coincides with high rigidity levels of the meat caused by rigor mortis.

Normally in Chile, a period from 4 to 22 hours elapses from the fish death to its entrance into the processing line. Due to rigor mortis, the rigidity of the salmon meat is high, which is maintained during the processing, approximately 2 hours period, elapsing between entrance to the processing line and packing.

By staying in this rigid condition, which complicates processing, it forces manual processing stages in order to avoid damages to the integrity of the meat. Additionally, the available process technology does not performs adequately due to the rigidity, mandating the use of manual labor or delaying the process until the rigidity diminishes enough to permit using the available technology.

This technological deficiency arises from the fact that the countries providing this technology process the salmons 40 to 50 hours after death, or in a state before rigor mortis appears (generally, before 3 hours after death). In both cases, the rigor mortis state is very low, and the technology is, therefore, designed for operating with very low levels of rigidity in the meat.

In this scenario, obtaining high quality fish filets is a delicate process, which in the case of salmon, includes a longitudinal cut of the entire beheaded salmon, thus obtaining two raw pieces that need to be processed for obtaining two boned filets.

Normally, in the salmon industry, the longitudinal cut of the fish is done either manually or using the technology designed for this purpose. It is common to use a "BAADER" filleting machine or an equivalent one, i.e., a mechanical equipment that cuts the fish in two halves, extracting the backbone together with the vertebral bones, leaving as in the manual cutting, the ventral pin bones ("pin bones").

After cutting, the ventral pin bones are extracted from the raw filet. When the rigidity is high, this operation must be done manually. Afterwards, the filet is skinned, defatted and ultimately packed or additionally processed for obtaining by-products like special cuts or pieces.

However, the pin boned filet is the most valuable item, and must comply with the international quality standards, such as being free of stains caused by hematomas or bruises, impeccable and healthy, without pin bones, and free of gapping (separation of the meat due to handling or exposition to machine work at an inadequate rigidity state).

Because of these restrictions, manual pin boning is the only procedure permitting boning without damaging the meat integrity when the filet is highly rigid.

This manual procedure comprises carefully extracting the pin bone, one by one, using an ergonomically designed tool, comprising a forceps that permits grabbing the bone's head and extract it, without breaking or cutting it due to the pressure applied on the bone.

Whereas the manual process is effective, it is inherently inefficient. Moreover, a worker doing this job normally suffers from chronic tendonitis in the long run. Apart of this health problem, the procedure results in high costs to the company due to the need to replace the trained worker with novel operators, usually lacking skills, in a procedure already inefficient.

Accordingly, several ways to mechanize this process has been sought. Patent DE-A-2-823 249 discloses a machine and a procedure that reduces the adhesion between meat and pin bones using heating, separating the meat by way of jets of liquids or air. However, the final product is pin boned fish meat more or less cooked.

Another procedure is disclosed in Patent DE-A-35 16 623, which uses a machine including hollow barrels having its surface with small openings. The pin bones are pressed against the barrels with a high force because the fish piece circulates on a conveyor. By pressing the fish piece against the openings, the bones separate from the meat. The result is fish meat that lost its original structure, resembling a pulp.

On the other hand, U.S. Pat. No. 5,525,101 discloses a device for removing fish pin bones comprising a roller including bone capturing means. Once captured, the bones are extracted applying a traction force. Nevertheless, this device is not adequate for fish meats with high rigidity because it damages its integrity.

In fact, this device is not adequate for pin boning processes when the fish is rigid, because extraction of the bones is violent, which damages the product. Under these conditions, the pin bones fracture, leaving pieces inside the meat, or the pin bone exits with such violence that rupturing of the meat surroundings occurs, thus generating gapping, and under conditions of extreme rigidity, the pin bones cannot be captured.

Present invention relates to an apparatus and procedure solving the abovementioned problems. In fact, the apparatus can be designed in mechanical or mechanical-electronic combinations versions permitting pin boning fish with different rigidity states, including high rigidity level caused by rigor mortis.

The boning device comprises means for generating vibrations, a pin boning device, and means for transmitting the vibrations from the vibrations generator to the pin boning device, or in a preferred embodiment of the invention, the apparatus comprising vibration generating means including a torque generator comprising elements controlling the maximum magnitude of torque delivered.

The torque and vibrations generating means permit detaching the pin bone from the meat for subsequent extraction. The system can be constructed in full mechanical or full mechanical-electronic versions. The mechanical-electronic version includes using electronic, electro-pneumatic, pneumatic, or electro-mechanical components and actuators. These components are activated or driven by means of controlling software included in one or several microprocessors, preferably electronically connected to the components and actuators. The torque generator in the mechanical embodiment includes multiple mobile parts and actuators, which coordinately generate vibration pulses and torque oscillating curves that lately are transformed in traction forces by the boning device. This movement is transmitted from the generator to the boning device by transmission means.

Independently from the design and construction version, the torque and vibrations generator provides the device with the necessary movement for pulling out the pin bones, said movement characterized by three fundamental aspects. The first one relates with the torque transmitted by the shaft being oscillating and variable through time. The second one being that through the movement, a vibration is transferred by the output shaft to the boning device, and from this one to the bone. The third one being that the magnitude of the maximum torque transmitted is limited and controlled, thus fine tuning the maximum tension transmitted to the pin bone.

In other words, the torque transmitted by the shaft is characterized in that its magnitude in time varies in a periodical form, with an oscillating frequency that can be modified. It is true that the torque magnitude and its oscillating frequency depend on some variables related to the environment and the quality of the raw material on which this boning technology operates. These variables in turn, relate with the fish species, the type of pin bones to be pulled out and the rigidity level of the fish meat during the process.

Generating the oscillating torque required for fish pin boning may be accomplished by several mechanisms. The less complex one is accomplished by coupling, in a manual pin boning device or forceps, a vibrating device, wherein the torque originates in the operator's wrist. At the same time, the operator shall control the magnitude of the applied torque for pulling out the bone without damaging the meat.

In another preferred embodiment of the full mechanical version, the mechanism for generating the oscillating torque involves the output shaft from a power source (motor), wherein said power source is capable of generating a constant torque, depending on the R.P.Ms. of the output shaft.

In the preferred embodiment, this mechanism comprises two inertial discs. The first disc rotates concentrically and is solidary with a shaft permanently connected to the power source. This disc can be moved axially and concentrically in relation to this shaft, transmitting the torque generated by the power source. The second disc is stationary, concentric and solidary with the output shaft, and at the same time, concentric with the first disc. The main feature of both discs is that they are made of fatigue resistant materials, wherein the contact surfaces are rough, permitting dragging of the second disc. Normally, steel is used in their manufacture.

For generating the oscillating torque, the first disc is displaced axially until it contacts the second disc, returning to its original location after a certain time of contact, according to a certain oscillation frequency. When both discs make contact, according to the oscillation frequency of the first disc, a face-to-face pressure is exerted, wherein the perpendicular force generated between both discs produces the friction necessary for avoiding slipping of the contacting surfaces, thus transmitting the torque to the second disc. Additionally, the face-to-face contact between the discs lasts a time corresponding to a fraction of the period. This time fraction can be regulated and modified, thus varying the oscillating torque curve. In fact, the oscillating torque frequencies depend on the rigidity of the raw material. Particularly preferred are oscillations in the range from about 0.1 Hz up to about 1,000 Hz, and much more preferable are frequencies from about 5 Hz up to 100 Hz. As an example, for a contact of 40% of 1 unit of time, the discs will be in contact 0.4 time units, thus providing torque transmission. During this time, a constant pulling out force on the bone will occur. On the other hand, during 0.6 time units, the discs will be free (without contact), the torque transmission will be nil and no force will be applied to the bone.

Another fundamental element of the movement is vibration. Vibration supplements the oscillating torque and generates a torque pulse on the oscillating torque curve. This pulse transforms itself in an instantaneous, punctual force on the bone, generating vibrations on the bone, wherein the frequency of this pulse generates resonance on the bone, which becomes loose. It is evident that vibrations can be generated trough several mechanisms, in example by means of a percussion on the shaft in the tangential direction and in the rotation sense of the shaft. Specifically, this method comprises generating a small impulse by means of a pre-cutting hammer impacting a disc solidary to the shaft, before the filter that will be described latter.

The impact of this hammer acts on the external surface of the disc in a semi-tangential direction, thus generating a tangential component that is a force translated at the shaft as a torque pulse.

Another way for generating vibrations comprises to strike axially on the oscillating torque generating discs. In other words, it consists in generating a second oscillating torque, but with a much reduced contact time between the discs. In this case, the impact force shall be sufficient to make the two discs contact one another, and in that the disc directly connected to the power source (motor) transmits the inertia for generating a torque pulse on the shaft.

In general, any mechanism generating the movement shall correspond with a punctual torque with adjustable magnitude and frequency of percussion.

Equally important is the capability for controlling the magnitude of the maximum output torque, because said force shall be only enough for pulling out the pin bone without damaging (fracturing it) thereof, or the fish meat. The mechanical torque and resonance generator of the invention also comprises a control mechanism, located at the transmission shaft, before the output shaft. This element couples the shaft transmitting the "coupled torque" (oscillating torque plus the vibration generated by the pulses) with the output shaft, thus permitting "filtering" the coupled torque before it exits through the output shaft, limiting the magnitude of the generated torque and smoothing too violent oscillations.

This controlling mechanism in the full mechanical preferred embodiment of the invention comprises multiple independent discs arranged in series, wherein only the first one is solidary with the shaft transmitting the coupled torque, and the last one is solidary with the output shaft. The remaining discs are concentric with the first one, arranged one beneath the other. The tolerance between the contact surfaces of the discs is minimal, only enough for permitting circulation of a liquid with controlled viscosity. Independently of the presence of the liquid, the discs surfaces are not in contact. The tolerance between both surfaces permits slipping. When the first disc rotates, a dragging-torque generates on the second disc, due to the viscosity of the liquid, causing it to rotate and reproducing the movement of the first disc, slightly smoothed, and so on over the following discs. This way, the torque transmitted to the output shaft is a smoothed reproduction of the torque entering the first disc. Due to the physical principle related to the viscosity of the liquid, when the entering torque surpasses the dragging viscous limit, the output torque is limited by the dragged torque. It has to be understood that the input torque is the coupled torque, which is not constant, but varies in time having instant maximum magnitudes, though punctual (as the above mentioned pulses). If these maximums exceed the maximum dragging torque, which depends on variables such as the viscosity and the total contact surface of the discs, the maximum torque transmitted by the discs corresponds to the maximum dragging torque. In other words, depending on the number of discs in the series, the coupled torque is smoothed and the viscosity of the liquid limits the magnitude of the output torque. Summarizing, this element controls the maximum force applied to the bone, also transmitting the vibration and the oscillating torque.

Another system, in a full mechanical-electronic preferred embodiment of the invention comprises integrating the torque generator, the percussion system and the torque magnitude filter in only one complex assembly including a power source and a torque controller that operates this power source. Hereinafter, this embodiment will be designed "electronic embodiment of the invention". In this embodiment, the power source is characterized by the possibility of generating temporal changes in the magnitude of the torque delivered. Additionally, it is resistant to sudden and consecutive changes on the magnitude of the torque delivered by the power source. These changes are generated by a torque controller and results in torque pulses that are repeated with a controlled frequency, amplitude and period, thus producing an oscillating controlled torque. At the same time, it is possible to generate second sequence or multiple pulse sequences (secondary frequencies) having a smaller period, but as with the main one, making it possible to control the frequency, amplitude and period. These secondary frequencies imitate percussions resulting in vibrations similar to the ones generated by the mechanical system. Independently of the type of pulses generated by the controller, the controller has the capacity to limit the maximum magnitude of the delivered torque by filtering out pulses that could damage (fracturing) the pin bone.

The torque controller is designed and constructed with electronic components and one or multiple processors operating through one or several control software. This software permits the user, being it a person or the global control software, through an interface, to assign the frequencies, amplitude, period and main pulse magnitude variables of the main torque, and the corresponding ones of the secondary pulses. Depending on the power source on which it operates, the torque controller generates the torque variations by intervening on the feed parameters of the power source. As an example, if the power source is an electric motor, the controller regulating the intensity and/or the voltage of the current supplied to the motor. If the power source would be an air motor, the controller regulates the flow rate and/or pressure of the air stream supplied to the motor.

The pin boning assembly captures the protruding head of the bone and also transmits the vibrations together with the traction, finally resulting in pulling out the bone.

In other words, during the pin boning process, the pin bone is captured, it starts vibrating, usually entering in mechanical resonance, causing its detachment, and then being mechanically pulled out by the device, which applies only enough force to pull out the bone without fracturing it, nor damaging the surrounding meat.

This pin boning device comprises a main system including an assembly of fixed and mobile parts, which transforms the oscillating torque in pulling out forces on the bone. Additionally, the pin boning device comprises vibration and oscillating torque transmitting elements to the pin bone, a sub-assembly that is designed as the transmission system. Moreover, the pin boning device can discard the extracted pin bones by means of water or air jets or under negative pressure (vacuum), thus eliminating the pin bones together with small meat pieces that could be attached to the device.

On the other hand, the transmission system of the pin boning assembly and the means transmitting the torque and vibrations of the apparatus include an assembly of mechanical elements transmitting the vibrations and the oscillating torque from the output shaft of the vibrations and torque generator, to the capturing and extraction elements of the pin boning device. The design of this transmission system varies according to the embodiment of the equipment and includes elements widely known in the art.

The design of the pin boning device depends on the raw material being processed and on the operating embodiment of the apparatus. The apparatus can be operated under two preferred embodiments: a manual one, wherein a person operates the apparatus, placing it on the raw material aiming to capturing and pulling out the bones, and an automatic embodiment, wherein a robotic or electromechanical or mechanical system operates the apparatus thus fully automating the boning process.

Under these premises, the manually operated boning apparatus comprises a boning assembly configured such that can be handled by one hand and operated by only one person. On the second preferred embodiment, the boning apparatus can be automatically operated by a robotic, electromechanical or mechanical system.

The manual operating system allows the operator to move the device in any spatial direction. In order to get this flexibility of movement, the device preferably comprises a flexible shaft mounted inside a sleeve of flexible, resilient material connecting the torque and vibrations generator's output shaft with the capture and extraction input shaft. Within the sleeve, the flexible shaft rotates into a lubricated environment. Depending on the designing capabilities of the manufacturer, or using preferably the electronic embodiment, it is possible to eliminate the flexible shaft and constructing the boning device with an integrated, reduced volume torque generator, such that the torque producing and boning device components constitutes only one element, thus directly transmitting the torque.

Specifically, the manual operation comprises the operator grabbing the pin boning device with his working hand, placing it over the fish piece that can be resting over a working table or on a slowly traveling conveyor belt. Then, the operator aligns the working area of the capture and extraction assembly with the pin bone's heads, moving the device until it captures the head of a bone and initiates the extraction process. During the extraction process, the device shall be in static relationship with the fish piece. Once the pin bone is pulled out, the operator moves the device towards the next pin bone, repeating the operation.

As for the automatic operating (robotic, electromechanical or mechanical) version, the transmission system can be the equivalent of the flexible shaft of the manual version, or can be integrated with the boning device by using preferably the electronic embodiment of the invention. The difference being that the boning device has to move only in a vertical plane, in direction X-Z, therefore as an example, making it possible to replace the transmission system with an assembly of pulleys and belts, in the case the system would not be integrated in the pin boning device. This assembly permits the boning device to move freely in the necessary directions without affecting the torque or vibrations power.

When the automatic embodiment is used, the pin boning device is operated by a robotic or mechanical-electronic system, which places the device over the meat to be pin boned, in such a way that the capture and extraction device can capture the pin bone's heads.

Particularly, the automatic system comprises an assembly of mobile and fixed elements, as well as sensors and actuators driven by the control system. The automatic comprises a slippage free conveyor transporting the fish pieces, with a positive rupture in relation with the horizontal plane in the pin bone capturing area, such as to expose the pin bones to the pin boning device, and a mechanical arm moving said boning device.

The operation of this system comprises the fish piece entering the conveyor in such a way that the pin bone's heads are aligned with the operating area of the pin boning device. When the fish piece approaches the pin boning device, the mechanical arm moves the pin boning device for contacting every pin bone's head. This contact is facilitated by the positive rupture of the conveyor in relation to the horizontal plane, thus exposing the heads of the pin bones to the device. Once the head of the pin bone is captured, it initiates the pulling out process. The time duration from the capture of the pin bone's head until the full extraction of the bone varies, even for different bones on one fish piece.

In this automatic procedure, the control system permits to coordinate the conveyor's speed with the arm movement, resulting in the capturing device being stationary in relation with the fish piece, during the operation of the pulling out process.

Another important aspect of present invention is that the mechanized pin boning system shall be configured or calibrated according the type and condition of the raw material being pin boned. This calibration involves two stages: a theoretical or static calibration, and a dynamic one.

The theoretical calibration means translates in physical elements, such as the torque and resonance control, and the pin boning device shall be configured according the particular conditions of the process.

Particularly in the preferred full mechanic embodiment, the theoretical calibration configures the torque and vibrations generator that, otherwise, would be impossible to modify during the operation of the equipment. This configuration has a fundamental incidence on the operational output of the system.

The theoretical calibration constants, in the fully mechanic embodiment, for the torque and vibrations generator are:

1.—Power Source
power source type (electric, pneumatic, hydraulic, combustion or other);
particular torque curve vs RPM of the power source;
RPM controller for the power source.
2.—Mechanical Parts
shafts and supporting elements (bearings, bushes);
inertial discs (as shape, contact surfaces, roughness of the contact zones);
dragging discs (number of dragging discs, contact surface zone with the viscous liquid, gap between discs);
percussion system.
3.—Viscous Liquid (viscosity, duration).
4.—Lubricants (oils, greases).

The pin boning device shall be statically configured before use, according to the type of raw material to be processed. Independently of the operating mode (manual or automatic), the capture and extraction system shall be configured. In both versions, full mechanical and/or full mechanical-electronic, the configuration involves modifications according with the type of raw material and the sizes to be processed.

Once the system is statically calibrated, the equipment is put to work. Fine adjustments are almost always necessary for an exact tuning according to the raw material processed. This new fine tuning depends on variables such as the size of the piece, which relates with the length and thickness of the pin bones, as well as the rigidity, which relates with the type of work necessary for extraction.

This calibration is justified because; despite the batches of raw material are of relatively homogeneous size during a process; the rigidity is variable because it is not possible to process a whole batch at the same time. Additionally, the temperature can vary during the process, and this condition critically affects the rigidity of the meat.

During dynamic calibration, the operating variables of the torque and vibration generator, in both, the full mechanical and the full mechanical-electronic embodiments, relate with the following conditions:

1.—Size of the Fish Pieces
quantity of pin bones;
thickness of the pin bones;
length of the pin bones.
2.—Rigidity of the Raw Material
rigor mortis level of the meat;
meat temperature.
3.—Quality of pin boning
gapping acceptability;
broken pin bones acceptability;
4.—Operation Mode of the Boning Device
Manually operated device (high variability of the operating mode due to operator comfort);
Automatically operated device (uniform operation, scarce operation variability).

These conditions affect the dynamical calibration of the torque and vibrations generator. The performance of the apparatus can be optimized by dynamically modifying the following variables:

1.—Capture velocity of the pin boning device;
2.—Frequency, amplitude and oscillation period of the main torque;
3.—Vibration frequency (frequency, amplitude and oscillating period of the secondary torque pulses);

These variables can be dynamically adjusted. In other words, they can be momentarily adjusted through an automatic system driven by the global control software, or by an operator controlling the equipment during the pin boning process.

Another aspect of present invention is a procedure for extracting the pin bones from a fish filet comprising detaching the pin bone (See FIG. 8) from the meat and then pulling out it by applying only the necessary force, in order to avoid fracturing thereof, and avoiding internal and/or external damage to the meat.

Pin Boning Procedure

Figure 8:
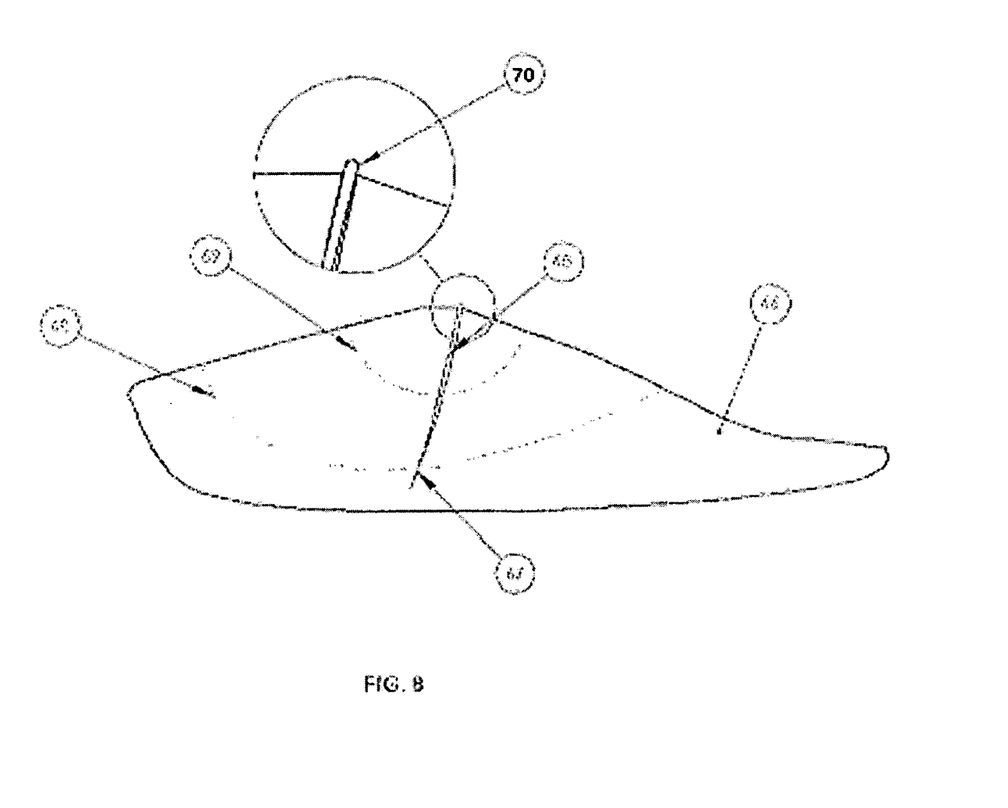
FIG. 8 shows a diagram of the ventral pin bones of a fish filet, in this case a front section.

Prior to the extraction, detaching of the bone includes capturing the head of the pin bone protruding from the meat, and applying a vibration approaching the proper resonating frequency of the pin bone. These vibrations cause distension of the muscular layers (68, 69) adhered to the bone, as well as damaging the membranes attaching the pin bone to the meat, including the complete rupture thereof. By diminishing the intervention of the membranes causes detachment of the pin bone, liberating an important adhesion component that keeps the pin bone attached to the meat. Once this happens, the pin bone becomes relatively detached making it possible to extract it with lesser work and damage to the meat.

This detachment procedure is particularly critical when the meat has a high level of rigidity.

The extraction procedure, applies multiple traction forces in the axial direction of the pin bone. While vibration detaches the pin bone, at the same time an oscillating traction force acts on the pin bone. In other words, repeated, briefs applications of traction forces acts on the pin bone until full extraction. The key feature for making efficient this procedure is that it never applies excessive force on the pin bone, thus avoiding its rupture. Though the pin bones are flexible, within the normal operating range of a pin boning process, it is likely to cause its rupture when moderate forces are applied, and it is still included in the meat. Therefore, violent forces increase the chances of rupture.

In fact, this condition of fragility increases with the level of rigidity of the meat.

BRIEF DESCRIPTION OF THE DRAWINGS

FIGS. 5*a*-*b*-*c* correspond to the extraction system based on the action of a pneumatically or electrically operated extraction forceps.

It is noted that all the elements contacting food are made with materials pursuant the food grades standards, i.e., stainless steel and plastics.

Additionally, all the components electric, electronic, motors and mechanical systems are protected from water and moisture with a protection index IP-67 (resistant to a direct water jet). The machine itself, installed in the processing line, can be washed with soap and water as necessary, during and after each shift. The pin boning device can be easily disassembled for complete washing.

DETAILED DESCRIPTION OF THE PREFERRED EMBODIMENTS

Figure 1:
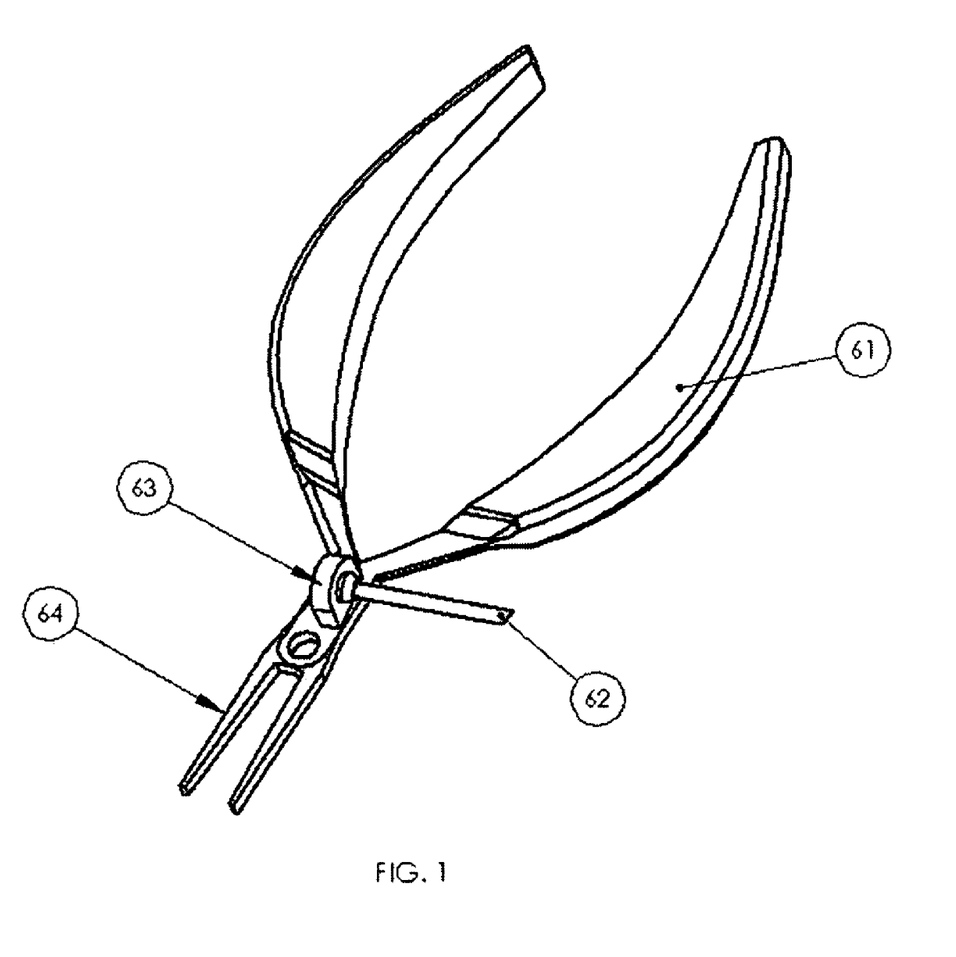
FIG. 1 illustrates a manual forceps, incorporating the vibrations system.

FIG. 1 shows the manual extraction apparatus using vibrations, in other words, the manual forceps with vibratory system 63, wherein reference number 64 corresponds to the capturing forceps, connected through the flexible shaft to the vibrations generator 63.

This embodiment of the invention comprises connecting a pin bone extracting forceps with a vibration generator 63. The objective is transmitting the vibrations to the pin bone, thus generating vibrations, causing detachment.

In this particular embodiment, the torque and vibrations generator comprises only the vibration generator, because the operator provides the torque with his wrist. The vibrations generator 63 comprises an eccentric shaft that rotates and moves its gravity center outside the rotation axis, thus generating vibrations in the forceps 64. As can be seen in FIG. 1, the vibrations generator 63 is located on the forceps and connected through a flexible shaft 62, to a power source generating a constant torque which rotates the eccentric shaft. Therefore, by adjusting only the R.P.Ms. of the power source, one may control the vibrations frequency.

The pin boning device in this embodiment comprises only the forceps, wherein the ends of the forceps can pick-up the head of the pin bone.

During operation of this embodiment, the operator press with his fingers the ergonomically designed handles of the forceps 61, controlling the pressure of the forceps ends on the head of the pin bone. At the same time, by exerting pressure on the head of the bone, the system vibrates, and by twisting his wrist, the operator places a traction force on the pin bone, resulting in the extraction thereof.

Figure 2:
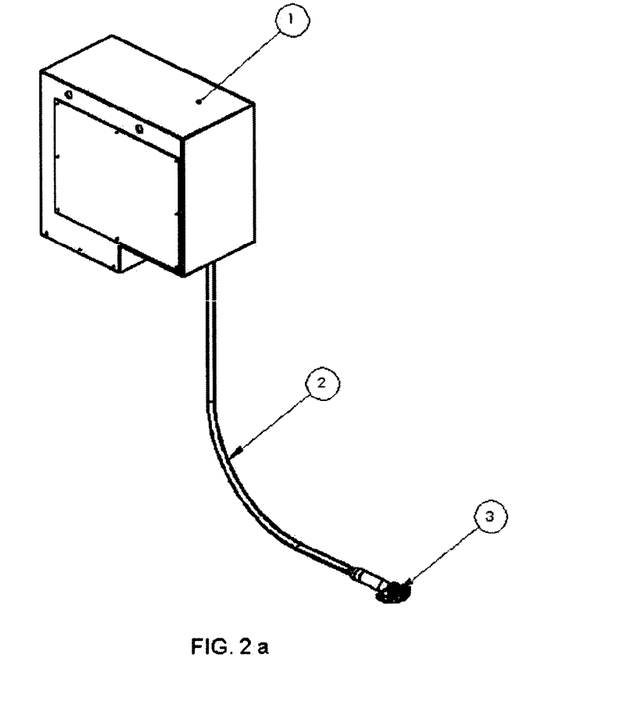
FIG. 2*a* shows a manual system of operation.
FIG. 2*b* shows a torque transmission system.

FIG. 2*a* discloses a full mechanical version of this manually operating embodiment. The torque and extraction generator 1 corresponds to the one illustrated in FIGS. 6*a*, 6*b*, and a flexible shaft and protective sleeve 2, transmits torque to the pin boning device 3.

FIG. 2*b* shows the torque transmission assembly connected to the boning device, wherein the flexible shaft and protecting sleeve 2 connects through a connecting piece 5, to the rear part of the ergonomic handle 6, thus transmitting torque through a flexible shaft 4.

Figure 6A:
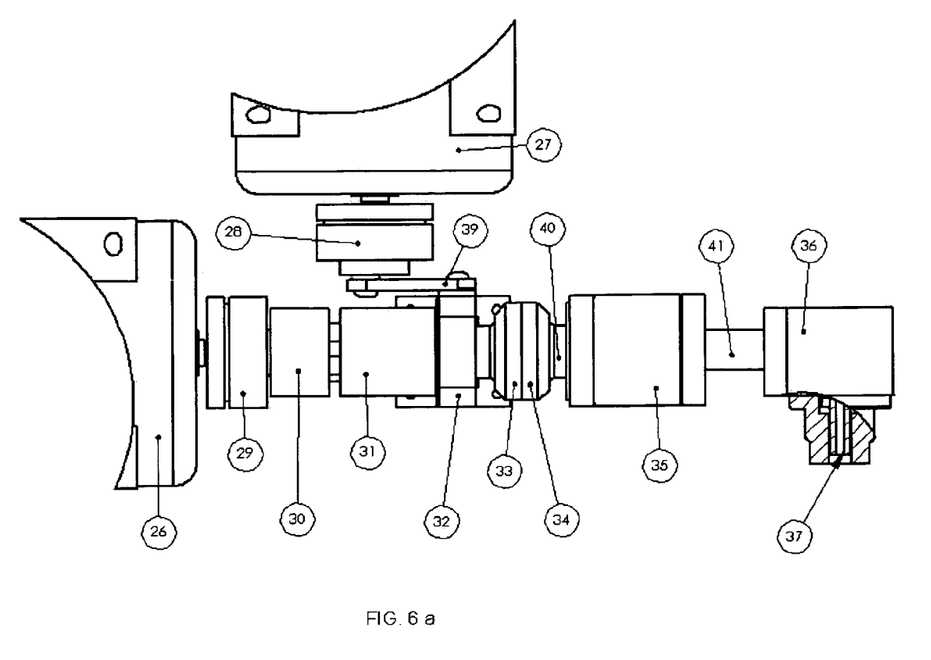
FIGS. 6*a*-*b*, illustrate the torque generator, in the fully mechanical version.
Figure 6B:
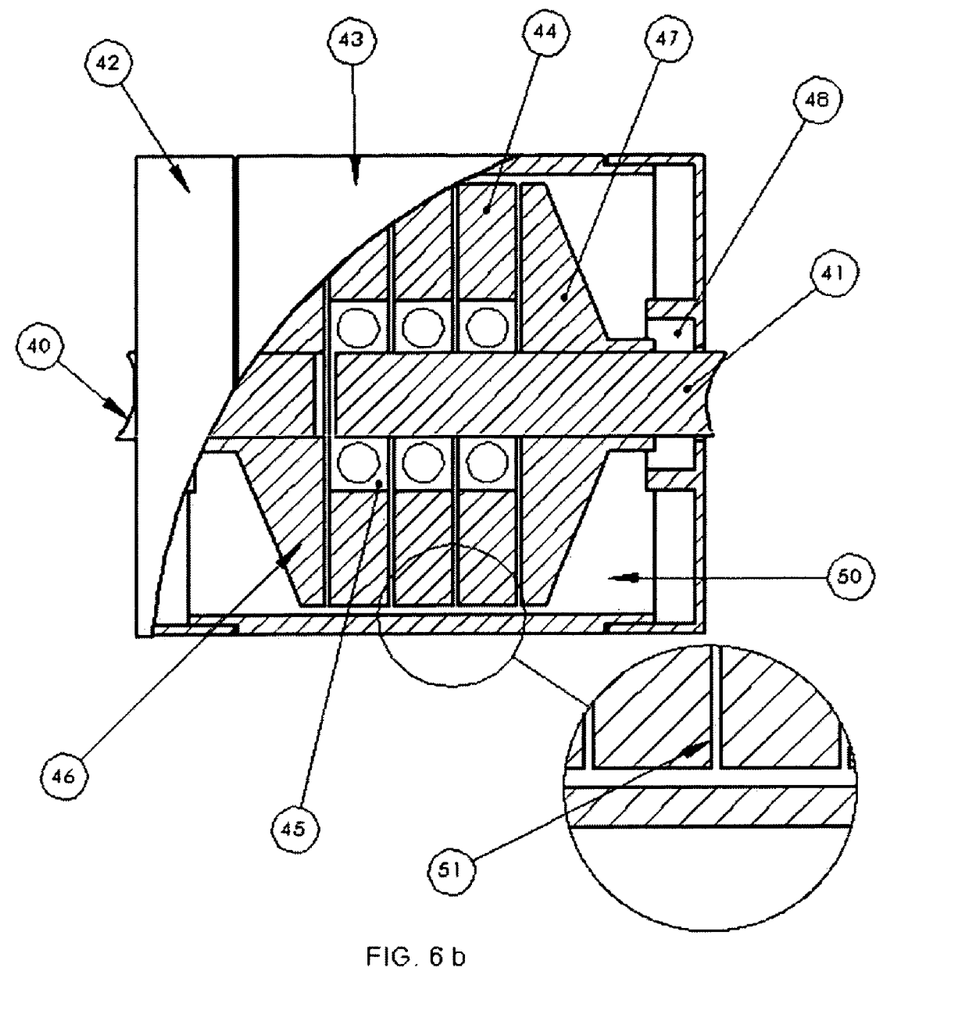

This embodiment of the invention comprises a manual pin boning device 3, ergonomically designed to be used by an operator, a torque and vibrations generator 1, corresponding to the one illustrated in FIGS. 6*a*, 6*b*, and a flexible shaft 2 covered by a protecting sleeve, which transmits the torque and vibrations to the boning device 3.

In this case, the operator holds the pin boning device 3 by its handle and passes it carefully over the area wherein the pin bones are located.

Before operating this type of device, the operator shall input, in the equipment control unit, the program code corresponding to the size and rigidity level of the raw material to be processed, then presses the starting button, if the equipment operates with control software. The detention button stops the machine. When the equipment operates without control software, the operator shall control and fine tune some of the variables related with the rigidity level, such as pin boning velocity, oscillating torque frequencies and vibrations frequencies.

Figure 3A:
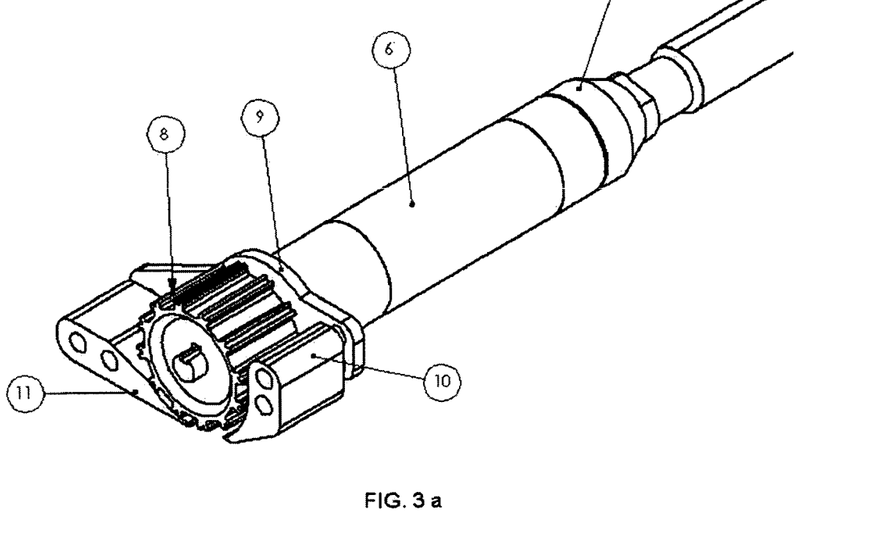
FIG. 3*a* illustrates the manually operated pin boning device, based on a roller.

FIG. 3*a* illustrates the manually operated boning device based on a roller 8 and edging 11. An ergonomic handle 6 comprises a base 9 supporting the edging 11, and a bone raising protective cover 10, fixed to the base by using bolts or other mechanical fastening means. The raising pin bone protective cover 10 is optional. Its functions are: to protect the fish meat in case of improper application of the roller, and raising the heads of the bones, thus facilitating their capture.

Figure 3B:
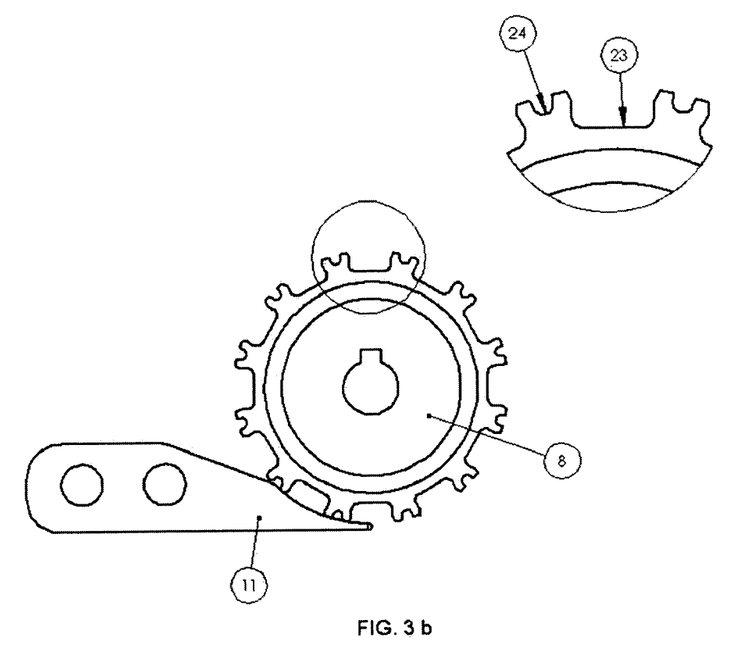
FIG. 3*b* illustrates the capture and extraction system, based on a roller.

FIG. 3b shows in detail the capture and extraction assembly based on roller 8 and edging 11. Independently of the operating mode, manually or automatic, the roller features grooves that form teeth. Between two consecutive teeth, there is a big cleft 23, and over the top portion of each tooth there is a smaller cleft 24.

It is common in this embodiment that the roller 8, especially the teeth part, is made of AISI 316 stainless steel (or other material with the same characteristics as for mechanical resistance and complying with food grade standards). In order to reduce its weight, the roller can comprise an external steel crown (forming the teeth) and a central cylinder made from a lighter material such as a plastic. The edging 11 is commonly made of "erthacetal" plastic or similar.

In operation, the roller 8 captures the head of a pin bone, pressing it between the roller's teeth 8 and the end of the plastic edging 11. The roller rotates in the extraction sense of the pin bone. But, at the moment the pin bone makes contact with the roller 8 and the edging 11, the roller stops and the pin bone suffers the vibrations from the torque and vibrations generator, corresponding to the one illustrated in FIGS. 6a, 6b (in the case of fully mechanical version), together with the oscillating extraction forces of controlled magnitude. Roller 8 transforms the oscillating torque in pulling out forces through the tooth pressing the pin bone against the edging.

When the pin bone becomes detached, the roller 8 resumes its rotation, pulling the pin bone out from the meat. Once the pin bone is extracted, it can be eliminated from the roller 8 by water or air jets or being suctioned by a vacuum source.

Figure 4:
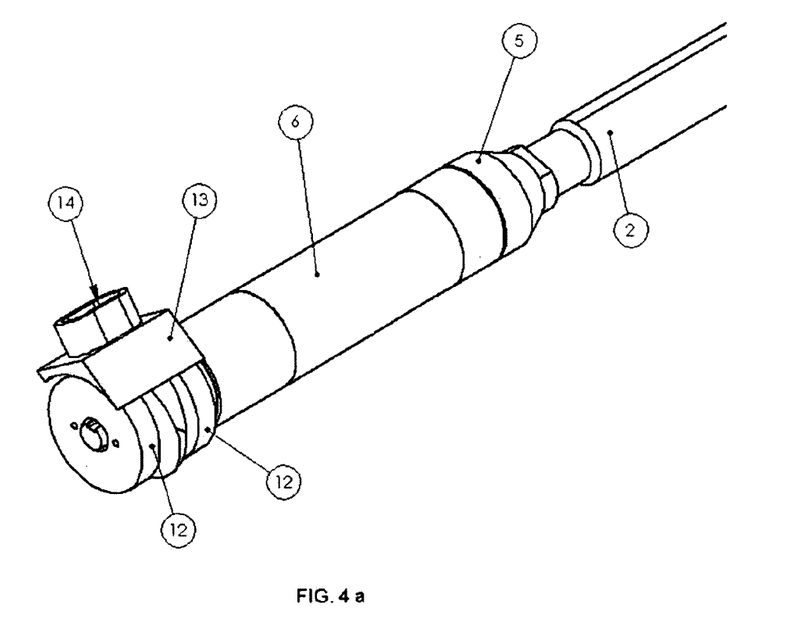
FIG. 4*a* shows the manually operating pin boning device, based on oblique discs.
FIG. 4*b* discloses the capture and extraction system, based on discs.

FIG. 4a shows a manually operating pin boning device based on oblique discs 12. A fixed base 13 keeps the discs in a face-to-face relation, having an outlet for the extracted pin bones 14, on its upper part. The ergonomic handle 6 is the same one used in the roller and edging embodiment, as well as components 5 and 2.

FIG. 4b illustrates the capture and extraction system based on discs 12, useful in a manually or automatically operated mode. These discs 12 have a flat surface in one of their faces; the other surface is cut out by an oblique plane. When the discs rotate at the same speed, space 25 formed by the internal faces, diminishes or enlarges depending on the rotation angle, thus permitting capturing the head of the bone in between.

In fact, during the extraction process, the head of the pin bone is captured between the discs 12. In this moment, the bone is not extracted because the discs 12 stop and the bone is subjected to the vibrations generated by the torque and vibration generator, corresponding to the one illustrated in FIGS. 6a, 6b, and at the same time, it is subjected to oscillating extraction forces of controlled magnitude. Discs 12 transform the oscillating torque in extraction forces through the action arm of the point pressing the bone against both discs 12. When the pin bone becomes detached, the discs resume their rotation, pulling out the pin bone from the meat. Once extracted, the pin bone can be expulsed from the discs 12 by air or water jets or being suctioned by a vacuum source.

Figure 5:
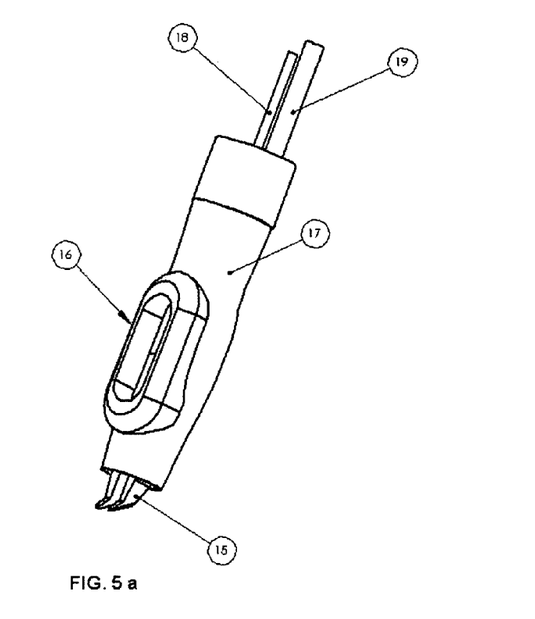

FIGS. 5a, b, and c illustrate an extraction system through a pneumatically or electrically operated extraction forceps 15. In normal state, the forceps 15 remains in the open position, and is covered by an ergonomic handle 17. Compressed air from the flexible tube 19 ends at cylinder 20. Valves (not shown) control the entrance and exit of the compressed air into the cylinder. When the admission valve is open, air enters the cylinder 20, pushing piston 22, which press the forceps, closing them. Once compressed the forceps, vibrations transmitted by the traction flexible shaft 18 and connected to the cylinder at 21, transmits the traction forces to the pin bone, until it is completely extracted and discarded through opening 16 by a suction tube. Traction flexible shaft 18 transmits forces from the torque generator, which transforms the rotational movement in an axial one by means o a suitable mechanism. This mechanism consists in a connecting rod attached in one of its ends to the top of the flexible shaft 18; the other end connects at a point of defined radius, solidary with the output shaft of the torque generator.

In this embodiment, the operator holds the mechanical, pneumatic or electric forceps, placing its ends 15 on the protruding head of the pin bone, capturing it with the forceps 15. To achieve this capture, the operator press the actuator opening the compressed air admission valve, allowing entrance of air into the cylinder and pushing the piston 22, thus closing the forceps and capturing the pin bone. Once the head of the pin bone is captured, the flexible cable 18 connecting the forceps 15 to the torque and vibrations generator transmits the oscillating traction forces and vibrations to the forceps and from this to the pin bone. In the torque and vibrations generator, the flexible cable 18 is linked to the connecting rod, which in turn is connected to the output-shaft of the generator. The connecting rod is dimensioned as a function of the bone type and raw material being processed. The connecting rod transforms the oscillating forces and causes axial movement of the flexible cable 18. The magnitude of this axial movement is enough for extracting the pin bone when the forceps is raised. Once the pin bone is fully extracted, the connecting rod reaches its maximum amplitude and the forceps 15 let the pin bone free. An elimination duct, connected to a discarding assembly, suctions the freed bone and meat pieces. Once the pin bone is suctioned, the forceps 15 returns to its normal state (open) and remains in this state until the operator repeats the operation.

FIGS. 6a, 6b, illustrate the torque and vibrations generator for the fully mechanical version. This generator comprises a percussion generator; an oscillating torque generator (assemblies 27, 32, 33, 34, 39) and a torque filter 35 based on a viscous liquid 50 and free rotating discs 44. These discs are separated by a small gap 51 and supported on a shaft by means of independent bearings 45. The input shaft 40 transfers the coupled torque to the input disc 46, and then exits through the output disc 47, which is solidary with the output shaft 41. The whole assembly is contained into cylinder 43, with airtight covers 42, having seals or O-rings 48, maintaining the liquid inside the cylinder.

Power source 26, with ample range for varying the R.P.M., generates the initial torque. The input shaft 30, connected to the power source is supported on bearing 29. This shaft transmits its torque to the percussion generator 31, the axially sliding support 32 and the contact disc 33. A connecting rod 39, connected to a second power source 27 and its support 28, axially moves this assembly. By varying the R.P.M. of the power source 27, the oscillation period of the oscillating torque can be controlled. The distance between the connecting rod 39 and the sliding support 32, controls the contact time among the discs.

Finally, after the torque filter there is a reducing gear 36, which is optional according to the operating mode (manual or automatic). The reducing gear is directly connected to the output shaft of the assembly 37. This shaft 37, in turn, connects directly to the flexible shaft (2 in FIG. 2a) in case of manual operation, or to the transmission (58, in FIG. 7b) in case of automatic operation.

Figure 7:
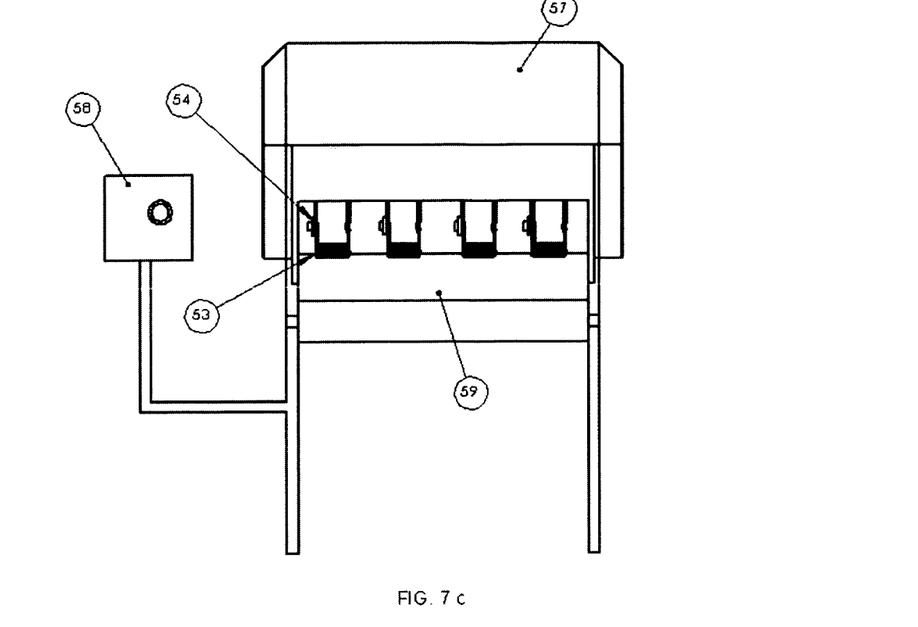
Figure 7A:
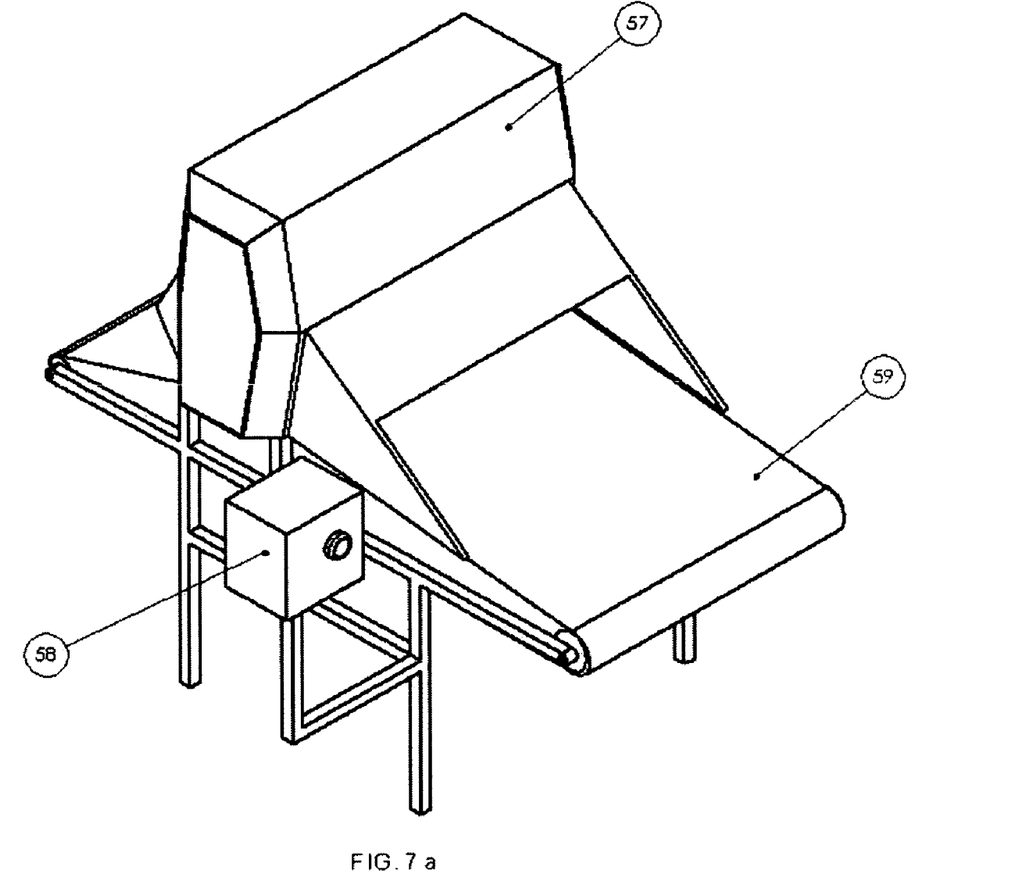
FIGS. 7*a*-*b*-*c* disclose an automatically operated system.

FIGS. 7a, b, and c correspond to an automatically operated mode having integrated the full mechanical vibrations generator. This mode comprises a slip-free conveyor belt 59 for the fish pieces, a housing 57 containing inside, for each track (FIG. 7c), an independent torque and resonance generator (52), normally corresponding to the one illustrated in FIGS. 6a, 6b, and a transmission assembly 58 connected to the boning device 53, which can be based in roller and edging, discs or forceps. This assembly is moved by an arm 54, driven by an optional actuator 55, or some other device permitting good positioning of the pin boning device 53 over the raw material. Additionally, an optional pin bone's head raiser 56 can be included, facilitating capture of the heads by the pin boning device. Finally, a control system 49 has an interface permitting interacting with the operator, according to the equipment type of control (manual control or through software).

Figure 7B:
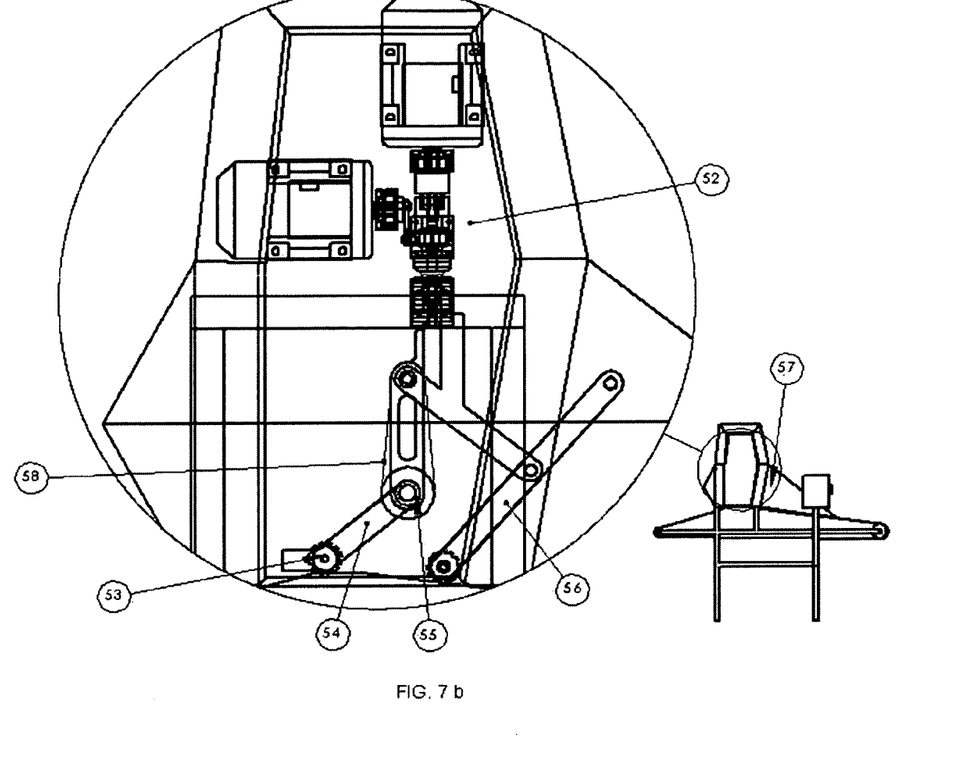

In this embodiment of the invention, normally the pieces of salmon come directly from filet forming machines. The incoming pieces are placed on a conveyor belt 59, such that are equally distributed on the tracks. Each track has one pin boning device 53 acting on a respective piece. The number of tracks is optional, depending on the requirements of the processing line. The system can be configured such that the pieces enter the machine with a head-to-tail direction or sideways. The objective of entering in a head-to-tail direction is that the pin boning device will act pin bone-by-pin bone, with one pin bone being extracted at the time. When the piece enters sideways, the pin boning device has to be configured with multiple capturing and extraction assemblies, arranged in parallel, such that all the pin bones can be more or less simultaneously extracted.

The movement of arm 54 supporting the pin boning device 53, as well as the capture and extraction assemblies is controlled by a robotic, electronic or mechanical system operating the whole machine, or another suitable system. It has to be noted that each capture and extraction assembly functions independently from another because each one has its own torque and vibrations generator.

In this case, the automatic equipment control system is very simple for the operator. Operator initiates the system by entering a program code in the control interface, corresponding to the size and rigidity level of the fish. If the raw material changes its state or condition during the process, either the operator or the control software shall change the dynamics of the system to new ones in harmony with such new condition, in order for the machine to function properly.

Lastly, FIG. 8 shows the ventral pin bones ("pin bones") of a fish, particularly a front cutting 66 of a filet of salmon or similar. The pin bone 65 can be seen attached to the meat by means of small membranes in the lower part 67, held by several muscular layers 68, 69. This pin bone slightly protrudes, presenting a small head 70, which is picked by the pin boning device for extraction.

I claim:

1. An apparatus to extract fish bones from a fish fillet that comprises a generator of torque and vibration to generate traction forces that incorporate mechanical vibrations, a fishbone removal device, and means for transmitting said vibrations and torque from the generator to the fishbone removal device that transforms said torque and vibrations into vibratory traction forces that allow extracting the fishbone from the fillet, wherein the generator of torque and vibrations comprises a driving source capable of varying the torque to be delivered and a torque controller acting on said driving source to generate a principal sequence of torque pulses controlled in their frequency, period, amplitude and magnitude, and secondary sequences of torque pulses with a lower period and a higher frequency, also controlled in their frequencies, periods, amplitudes and magnitudes, wherein the controller, independently of the type of generated pulses, limits the maximum magnitude of delivered torque by filtering those pulses that could cause a breakage of a fishbone.

2. The apparatus of claim 1, wherein the fishbone removal device that transfers the torque as traction forces to the fish bones is selected from the group consisting of forceps, roller and edging, pneumatic powered forceps and discs.

3. The apparatus of claim 2, wherein when the fishbone removal device is roller and edging, and said roller is grooved.

4. The apparatus of claim 2, wherein the fishbone removal device is discs, said discs being arranged such that under rotation, the distance between them varies from an external point of view, thus permitting capture of the fishbone.

5. The apparatus of claim 1, wherein the frequency of the mechanical vibrations is from 0.1 to 1,000 Hz.

6. The apparatus of claim 5, wherein the frequency of the mechanical vibrations is from 5 to 100 Hz.

7. A process to remove fish bones from fish meat, said process comprising positioning an apparatus to remove fish bones from fish fillets over a fish fillet to be freed from fish bones, capturing the fish bones with a fishbone removal device of the apparatus and applying traction forces that incorporate mechanical vibrations and extracting a fishbone without damaging the fishbone nor the fish meat, wherein said apparatus generates torque and vibrations to generate traction forces that incorporate mechanical vibrations, and transmits said vibrations and torque from the generator to the fishbone removal device that transforms said torque and vibrations in vibratory traction forces that allow extracting the fishbone from the fillet without damaging the fishbone or the fish meat, said generator of torque and vibrations having a driving source capable of varying the torque to be delivered and a torque controller acting on said driving source to generate a principal sequence of torque pulses controlled in their frequency, period, amplitude and magnitude, and secondary sequences of torque pulses with a lower period and a higher frequency, also controlled in their frequencies, periods, amplitudes and magnitudes wherein the controller independently of the type of generated pulses, limits the maximum magnitude of delivered torque by filtering those pulses that could cause a breakage of a fishbone.

8. The method of claim 7, wherein the frequency of the mechanical vibrations is from 0.1 to 1,000 Hz.

9. The method of claim 8, wherein the frequency of the mechanical vibrations is from 5 to 100 Hz.

* * * * *

UNITED STATES PATENT AND TRADEMARK OFFICE
CERTIFICATE OF CORRECTION

PATENT NO. : 7,247,086 B2  Page 1 of 1
APPLICATION NO. : 11/271982
DATED : July 24, 2007
INVENTOR(S) : Cristian Garcia Schneider It is certified that error appears in the above-identified patent and that said Letters Patent is hereby corrected as shown below:

On the title page, item (12), line 2, "Schneidedr" should read --Schneider--.

On the title page, item (75), line 1, "Chistian Garcia Schneidedr, Santago" should read --Cristian Garcia Schneider, Santiago--.

Signed and Sealed this

Twelfth Day of August, 2008

JON W. DUDAS
*Director of the United States Patent and Trademark Office*